US010807138B2

(12) United States Patent
Miyazaki et al.

(10) Patent No.: US 10,807,138 B2
(45) Date of Patent: Oct. 20, 2020

(54) TAILORED BLANK FOR HOT STAMPING, HOT STAMPED MEMBER, AND METHODS FOR MANUFACTURING SAME

(71) Applicant: Nippon Steel & Sumitomo Metal Corporation, Tokyo (JP)

(72) Inventors: Yasunobu Miyazaki, Tokyo (JP); Yasuaki Naito, Tokyo (JP); Kaoru Kawasaki, Tokyo (JP); Takahiro Yoshinaga, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 53 days.

(21) Appl. No.: 15/863,286

(22) Filed: Jan. 5, 2018

(65) Prior Publication Data

US 2018/0126437 A1    May 10, 2018

Related U.S. Application Data

(62) Division of application No. 14/385,559, filed as application No. PCT/JP2013/059287 on Mar. 28, 2013, now Pat. No. 9,901,969.

(30) Foreign Application Priority Data

Mar. 28, 2012  (JP) ................................ 2012-074222
Apr. 17, 2012  (JP) ................................ 2012-093812

(51) Int. Cl.
  *B23K 26/21*   (2014.01)
  *B23K 26/32*   (2014.01)
  (Continued)

(52) U.S. Cl.
  CPC ............ *B21D 22/022* (2013.01); *B23K 10/02* (2013.01); *B23K 15/006* (2013.01);
  (Continued)

(58) Field of Classification Search
  CPC .... B23K 26/211; B23K 26/32; B23K 26/322; B23K 26/26; B23K 10/02; B23K 15/006;
  (Continued)

(56) References Cited

U.S. PATENT DOCUMENTS 2,963,129 A * 12/1960 Eberle .................... B23K 9/232
                                                    138/177
4,459,062 A *  7/1984 Siebert ..................... B23K 9/23
                                                    219/76.16
(Continued)

FOREIGN PATENT DOCUMENTS

EP    2270257       1/2011
JP    55-42104 A    3/1980
(Continued)

OTHER PUBLICATIONS

Chinese Search Report for Application No. 201380016621.2, dated Nov. 23, 2015.
(Continued)

*Primary Examiner* — Ryan D Kwiecinski
(74) *Attorney, Agent, or Firm* — Birch, Stewart, Kolasch & Birch, LLP

(57) ABSTRACT

A tailored blank for hot stamping includes a welded portion formed by butt-welding a first aluminum-plated steel sheet and a second aluminum-plated steel sheet, an Average Al concentration of a weld metal in the welded portion is in a range of 0.3 mass % to 1.5 mass %, an $Ac_3$ point of the weld metal is 1250° C. or lower, and furthermore, an aluminum layer formed during the butt-welding is present on a surface of the welded portion.

6 Claims, 2 Drawing Sheets

(51) Int. Cl.

| | | |
|---|---|---|
| *B21D 22/02* | (2006.01) | |
| *B32B 15/01* | (2006.01) | |
| *B23K 26/211* | (2014.01) | |
| *C22C 21/02* | (2006.01) | |
| *C22C 38/06* | (2006.01) | |
| *C22C 38/18* | (2006.01) | |
| *C22C 38/32* | (2006.01) | |
| *C22C 38/02* | (2006.01) | |
| *C22C 38/04* | (2006.01) | |
| *C21D 9/50* | (2006.01) | |
| *B23K 26/26* | (2014.01) | |
| *C22C 38/38* | (2006.01) | |
| *B23K 10/02* | (2006.01) | |
| *B23K 15/00* | (2006.01) | |
| *B23K 101/18* | (2006.01) | |
| *B23K 101/32* | (2006.01) | |
| *B23K 101/34* | (2006.01) | |
| *B23K 103/04* | (2006.01) | |
| *B23K 103/08* | (2006.01) | |
| *B23K 103/00* | (2006.01) | |
| *C21D 1/673* | (2006.01) | |

(52) U.S. Cl.
CPC ............ *B23K 26/211* (2015.10); *B23K 26/26* (2013.01); *B23K 26/32* (2013.01); *B32B 15/012* (2013.01); *C21D 9/50* (2013.01); *C22C 21/02* (2013.01); *C22C 38/02* (2013.01); *C22C 38/04* (2013.01); *C22C 38/06* (2013.01); *C22C 38/18* (2013.01); *C22C 38/32* (2013.01); *C22C 38/38* (2013.01); *B23K 2101/18* (2018.08); *B23K 2101/32* (2018.08); *B23K 2101/34* (2018.08); *B23K 2103/04* (2018.08); *B23K 2103/08* (2018.08); *B23K 2103/50* (2018.08); *C21D 1/673* (2013.01); *C21D 2251/00* (2013.01); *Y10T 403/478* (2015.01)

(58) Field of Classification Search
CPC ............ B23K 2103/04; Y10T 403/478; B21D 22/022; C21D 9/50; B32B 15/012
USPC .................................. 403/270, 271, 272
See application file for complete search history.

(56) References Cited

U.S. PATENT DOCUMENTS

| | | | | |
|---|---|---|---|---|
| 5,148,966 | A * | 9/1992 | Minase | B23K 31/02 |
| | | | | 228/149 |
| 5,532,454 | A * | 7/1996 | Kuhnen | B23K 9/0213 |
| | | | | 219/125.11 |
| 6,336,583 | B1 * | 1/2002 | Wang | B23K 31/02 |
| | | | | 228/175 |
| 6,590,180 | B1 | 7/2003 | Suh et al. | |
| 8,653,403 | B2 * | 2/2014 | Honma | B23K 15/006 |
| | | | | 219/121.14 |
| 8,992,109 | B2 * | 3/2015 | Ishikawa | B23K 15/006 |
| | | | | 403/270 |
| 9,616,513 | B2 * | 4/2017 | Garcia | B23K 35/3066 |
| 9,808,876 | B2 * | 11/2017 | Xia | B23K 9/0352 |
| 9,827,633 | B2 * | 11/2017 | Schmit | B23K 26/26 |
| 9,901,969 | B2 * | 2/2018 | Miyazaki | C22C 38/38 |
| 10,016,958 | B2 * | 7/2018 | Alber | B32B 15/01 |
| 2005/0079092 | A1 | 4/2005 | Ochi et al. | |
| 2006/0165480 | A1 * | 7/2006 | Kennedy | B23K 33/00 |
| | | | | 403/272 |
| 2009/0139608 | A1 | 6/2009 | Tanaka et al. | |
| 2009/0220815 | A1 * | 9/2009 | Canourgues | B23K 9/23 |
| | | | | 428/583 |
| 2010/0159265 | A1 * | 6/2010 | Fairchild | B23K 9/0282 |
| | | | | 428/586 |
| 2011/0174418 | A1 | 7/2011 | Maki et al. | |
| 2012/0291510 | A1 | 11/2012 | Kim et al. | |
| 2013/0076075 | A1 | 3/2013 | Pohl et al. | |
| 2014/0003860 | A1 * | 1/2014 | Evangelista | B23K 9/235 |
| | | | | 403/270 |
| 2016/0318127 | A1 * | 11/2016 | Gu | B23K 26/322 |
| 2016/0332256 | A1 * | 11/2016 | Gu | B23K 26/60 |
| 2016/0368094 | A1 * | 12/2016 | Breuer | B23K 26/26 |
| 2017/0080523 | A1 * | 3/2017 | Andersson | B23K 9/167 |
| 2017/0182605 | A1 * | 6/2017 | Rajagopalan | B23K 37/003 |
| 2018/0326538 | A1 * | 11/2018 | Breuer | B23K 35/3066 |
| 2018/0345407 | A1 * | 12/2018 | Ueno | B23K 9/23 |

FOREIGN PATENT DOCUMENTS

| | | | |
|---|---|---|---|
| JP | 62-116720 A | 5/1987 | |
| JP | 11-277221 A | 10/1999 | |
| JP | 11-277266 | 10/1999 | |
| JP | 2002-194518 A | 7/2002 | |
| JP | 2002-371378 A | 12/2002 | |
| JP | 2004-334919 A | 11/2004 | |
| JP | 2007154257 | 6/2007 | |
| JP | 2007-210023 | 8/2007 | |
| JP | 2009-045628 | 3/2009 | |
| JP | 2009-149917 | 7/2009 | |
| JP | 2009-534529 | 9/2009 | |
| RU | 2395593 C1 | 7/2010 | |
| RU | 2403291 C2 | 11/2010 | |
| RU | 2423532 C1 | 7/2011 | |
| TW | I292355 | 1/2008 | |
| TW | I301854 | 10/2008 | |
| WO | WO 2007037447 | 4/2007 | |
| WO | WO 2008/069289 A1 | 6/2008 | |
| WO | WO-2013014481 A1 * | 1/2013 | ......... B23K 35/3053 |

OTHER PUBLICATIONS

International Search Report for PCT Application No. PCT/JP2013/059287, dated Jun. 11, 2013, with English language translation.
Kasuya, Tadashi, "Carbon Equivalent to Asses Hardenability of Steel and Prediction of HAZ Hardness Distribution," Nippon Steel Technical Report, No. 95, 2007, pp. 53-61.
Kasuya, Tadashi, "Carbon Equivalent to Assess Hardenability of Steel and Prediction of HAZ Hardness Distribution," Nippon Steel Technical Report, No. 385, 2006, pp. 45-55, with English Abstract.
Leslie, William C., "The Physical Metallurgy of Steels," 1981, pp. 256-257.
Russian Office Action for Application No. 2014139827, dated Jan. 11, 2016, with English language translation.
Search Report for European Application No. 13769761.1, dated Apr. 4, 2016.
Taiwanese Office Action for Application No. 102111148, dated Jul. 24, 2015, with English language translation.
U.S. Notice of Allowance for copending U.S. Appl. No. 14/385,559, dated Oct. 24, 2017.
U.S. Office Action for copending U.S. Appl. No. 14/385,559, dated Mar. 14, 2017.
U.S. Office Action for copending U.S. Appl. No. 14/385,559, dated Oct. 7, 2016.
Brazilian Office Action dated Nov. 6, 2018 for Counterpart Application No. BR112014023783-2 with English Translation.

* cited by examiner

TAILORED BLANK FOR HOT STAMPING, HOT STAMPED MEMBER, AND METHODS FOR MANUFACTURING SAME

CROSS REFERENCE TO RELATED APPLICATIONS

This application is a Divisional of copending application Ser. No. 14/385,559, filed on Sep. 16, 2014, which was filed as a National Phase of PCT International Application No. PCT/JP2013/059287 on Mar. 28, 2013, which claims the benefit under 35 U.S.C. § 119(a) to Patent Application No. 2012-074222, filed in Japan on Mar. 28, 2012 and Patent Application No. 2012-093812, filed in Japan on Apr. 17, 2012, all of which are hereby expressly incorporated by reference into the present application.

TECHNICAL FIELD OF THE INVENTION

The present invention relates to a tailored blank for hot stamping which is obtained by welding multiple steel sheets and is offered for hot stamping (also called hot pressing or diequenching; however, herein, referred to as hot stamping), and a method for manufacturing the same. In addition, the present invention relates to a hot stamped member obtained by performing hot stamping on the tailored blank for hot stamping, and a method for manufacturing the same.

RELATED ART

In recent years, there has been an increasing demand for reducing the weight from the viewpoint of global environmental protection, and accordingly, there have been active studies regarding the application of a high-strength steel sheet to automobile members. Furthermore, the required strength of steel is also gradually increasing.

However, the high strengthening of a steel sheet leads to an increase in the pressing force required for pressing, and an increase in the size of a facility is accompanied by an increase in facility costs. Furthermore, it is pointed out that, in a case in which a higher strength is provided to a steel sheet, the difficulty of forming resulting from the high strengthening of the steel sheet may cause problems with the costs for altering a die, the costs for reducing the wear of the die, and the degradation of productivity due to restriking for improving the shape-fixing property, which lead to an increase in costs.

Hot stamping is attracting attention as one of the methods for solving the above-described problems. Hot stamping refers to a technique in which a steel sheet is heated to a high temperature, and is pressed in a high-temperature range. Particularly, hot stamping is a technique in which a steel sheet is pressed in a temperature range of $Ar_3$ point or higher, the steel sheet is rapidly cooled through heat transfer using a die (pressing die), and phase transformation such as martensite transformation or bainite transformation is caused in the steel sheet structure under the application of a pressing pressure, whereby a pressed product having a high strength and an excellent shape-fixing property can be manufactured.

On the other hand, to improve the yield and productivity of a pressed product, a tailored blank is used as a material for pressing for automobile members and the like.

The tailored blank refers to a material for pressing obtained by joining the edge surfaces of multiple steel sheets through laser welding or the like in accordance with the intended use. The use of the tailored blank enables the unrestricted change in the sheet thickness or the strength in a single product. As a result, the functionality of the product improves, and the number of members can be reduced.

Meanwhile, for the majority of members requiring corrosion resistance such as automobile members, a zinc-based plated steel sheet is used. However, in a case in which a blank (material for pressing) is hot-stamped, the blank is heated to a temperature in a range of 700° C. to 1000° C. This temperature is close to the boiling point of zinc, or is higher than the boiling point of zinc. Therefore, when hot stamping is performed on the zinc-based plated steel sheet, there is a case in which a portion of the plated layer on the surface is melted or evaporated during heating for the hot stamping. Therefore, as a blank for hot stamping, it is desirable to use a steel sheet covered with an Al-based plate having a higher boiling point than the zinc-based plate, that is, a so-called aluminum-plated steel sheet from the viewpoint of suppressing the melting or evaporating of the plated layer.

However, in Patent Document 1, it is pointed out that, in a case in which butt welding is performed on an aluminum plate, aluminum, which is a plated coat, moves into the weld metal, segregates, forms an intermetallic region, serves as a starting point of fracture, and degrades the deformability of a joined portion.

Patent Document 1 also discloses that welding is performed after the removal of the plated layer in a portion to be welded in order to solve the above-described problem.

PRIOR ART DOCUMENT

Patent Document

[Patent Document 1] Published Japanese Translation No. 2009-534529 of the PCT International Publication

DISCLOSURE OF THE INVENTION

Problems to be Solved by the Invention

According to the method disclosed by Patent Document 1, it is possible to suppress the movement and concentration of aluminum into the weld metal from the plated coat, and it is possible to suppress adverse effects caused by the movement and concentration of aluminum. However, a steel sheet obtained using the method disclosed by Patent Document 1 does not have a plated layer in a portion to be welded, and therefore there is a problem of the occurrence of the decarburization or oxidization of the weld metal during hot stamping or a problem of a member obtained through hot stamping having poor corrosion resistance. In addition, a new step for removing the plated layer in a portion to be welded is required, and therefore the degradation of productivity or an increase in the costs is caused.

The invention has been made in consideration of the above-described techniques of the related art, and an object of the invention is to provide a tailored blank for hot stamping enabling the ensuring of a sufficient joint strength after hot stamping, and a method for manufacturing the same. In addition, another object of the invention is to provide a hot-stamped member obtained using the tailored blank for hot stamping and a method for manufacturing the same.

Means for Solving the Problem

The present inventors conducted studies to omit the process for removing the plated layer in a portion to be welded, which is proposed in Patent Document 1. That is, intensive studies were conducted to put into practical use a tailored blank for hot stamping obtained by performing butt welding on the plated layer in a portion to be welded in an aluminum-plated steel sheet without removing the plated layer, which is difficult to perform in Patent Document 1.

As a result, the inventors newly found that, when the movement and concentration of aluminum into the weld metal from the plated coat are accelerated instead of preventing the movement and concentration of aluminum into the weld metal from the plated coat as proposed in Patent Document 1, it is possible to form an aluminum layer on the surface of the weld metal. In addition, it was newly found that, when the aluminum layer is formed on the surface of the weld metal by accelerating the movement and concentration of aluminum into the weld metal, it is possible to solve the problem of the occurrence of the decarburization or oxidization of the weld metal during hot stamping or the problem of the member obtained through hot stamping having poor corrosion resistance.

On the other hand, a new problem was also found that, when the movement and concentration of aluminum into the weld metal from the plated coat are excessively accelerated, it is difficult to ensure a sufficient joint strength in the hot-stamped aluminum-plated steel sheet.

The above-described fact was found to result not from the formation of the intermetallic region as described in Patent Document 1 but from the fact that the movement and concentration of aluminum into the weld metal from the plated coat during welding increases the $Ac_3$ point of the weld metal to a high temperature, and thus it becomes difficult to increase the strength by hardening the weld metal in a hot stamping process or the fact that, in some cases, the strength is weakened due to tempering.

Accordingly, the inventors conducted studies to ensure a sufficient joint strength in a hot-stamped member after hot stamping even when the weld metal is not sufficiently quenched in the hot stamping process or the weld metal is tempered in the hot stamping process. As a result, the inventors reached a new idea of increasing the strength of the weld metal in advance before the hot stamping process instead of achieving the high strengthening of the weld metal by quenching in the hot stamping process.

In addition, the inventors found that, when the movement and concentration of aluminum into the weld metal from the plated coat are controlled within an appropriate range, and the $Ac_3$ point of the weld metal is set to a predetermined temperature or lower, it is possible to quench the weld metal during a cooling process in a butt welding process that is a process before hot stamping, and thus it becomes possible to increase the strength of the weld metal. That is, it was found that, even when the weld metal is not quenched in the hot stamping process or the weld metal is tempered in the hot stamping process, it is possible to ensure a sufficient joint strength in a hot-stamped member after hot stamping.

Furthermore, the inventors found that increasing the hardenability of the weld metal enables the acceleration of the quenching during the cooling process in the butt welding process that is a process before hot stamping, setting the $Ac_1$ point of the weld metal to a predetermined temperature or lower enables the use of quenching in the hot stamping process, and setting the minimum thickness of the weld metal to a predetermined value or more enables the ensuring of a higher joint strength after hot stamping.

Moreover, the inventors found that specifying the shape of the weld metal enables a more reliable contact between the vicinity of a welded portion in a tailored blank for hot stamping and a die, and thus it is possible to more reliably quench the vicinity of the welded portion in the tailored blank for hot stamping through the heat transfer of the die.

Furthermore, the inventors found that increasing the oxygen content in the weld metal enables the improvement of the toughness of the weld metal.

The present invention has been made based on the above-described new findings, and the essences thereof are as described below.

(1) That is, according to a first aspect of the present invention, there is provided a tailored blank for hot stamping including a welded portion formed by butt-welding a first aluminum-plated steel sheet and a second aluminum-plated steel sheet, in which an average Al concentration of a weld metal in the welded portion is 0.3 mass % to 1.5 mass %, in the following formula (1), an $Ac_3$ point of the weld metal defined in unit ° C. is 1250° C. or lower, and furthermore, an aluminum layer formed during the butt-welding is present on a surface of the welded portion.

[Expression 1]

$$Ac_3 = 910 - 230 \times C^{0.5} - 15.2 \times Ni + 44.7 \times Si + 104 \times V + 31.5 \times Mo + 13.1 \times W - 30 \times Mn - 11 \times Cr - 20 \times Cu + 700 \times P + 400 \times Al + 120 \times As + 400 \times Ti \quad \text{Formula(1)}$$

Here, C, Ni, Si, V, Mo, W, Mn, Cr, Cu, P, Al, As, and Ti in the formula represent amounts of individual elements in the weld metal in mass %, and elements not contained are considered to have an amount of zero in computation.

(2) in the tailored blank for hot stamping according to the above-described (1), furthermore, in the following formula (2), $\Delta t_M$ defined in unit second may be 0.5 seconds or longer.

[Expression 2]

$$\Delta t_M = \exp\left\{10.6\left(C + \frac{Si + 5 \times Al}{24} + \frac{Mn}{6} + \frac{Cu}{15} + \frac{Ni}{12} + \frac{Mo}{6} + \frac{Cr \times (1 - 0.16 \times \sqrt{Cr})}{8} + \Delta H\right) - 4.8\right\} \quad \text{Formula (2)}$$

Here, C, Si, Al, Mn, Cu, Ni, Mo, and Cr in the formula represent the amounts of individual elements in the weld metal in mass %, elements not contained are considered to have an amount of zero in computation, and $\Delta H$ in the formula represents a numeric value defined as described below in accordance with the amount of B in mass % and fN when the fN is set to (0.02−N)/0.02 using the amount of N in the weld metal in mass %.

When $B \leq 0.0001$, $\Delta H = 0$,
When $0.0001 < B \leq 0.0002$, $\Delta H = 0.03 \times fN$,
When $0.0002 < B \leq 0.0003$, $\Delta H = 0.06 \times fN$, and
When $0.0003 < B$, $\Delta H = 0.09 \times fN$.

(3) In the tailored blank for hot stamping according to the above-described (1) or (2), furthermore, an $Ac_1$ point of the weld metal defined in unit OC in the following formula (3) may be 860° C. or lower.

[Expression 3]

$$Ac_1 = \exp(6.5792 - 0.038058 \times C + 0.052317 \times Si + 0.011872 \times Ni - 0.045575 \times V + 0.18057 \times Al + 0.011442 \times W - 0.013403 \times Cu + 5.5207 \times B + 0.91209 \times S - 1.1002 \times P + 0.060014 \times Mn \times C - 0.096628 \times Cr \times C + 0.050625 \times Cr \times Si + 0.39802 \times Mo \times C - 0.34782 \times Mo \times Mn + 0.40986 \times Mo \times Si - 0.12959 \times$$

$Mo \times Cr - 0.048128 \times Ni \times C - 0.01090 \times Mn^2 - 0.03550 \times Si^2 + 0.010207 \times Cr^2 + 0.36074 \times Mo^2 - 0.0030705 \times Ni^2)$  Formula (3)

Here, C, Si, Ni, V, Al, W, Cu, B, S, P, Mn, Cr, and Mo in the formula represent amounts, in mass %, of individual elements in the weld metal, and elements not contained are considered to have a content of zero in computation.

(4) In the tailored blank for hot stamping according to any one of the above-described (1) to (3), when a thickness of a thinnest portion of the weld metal is represented by t in unit mm, a sheet thickness of the first aluminum-plated steel sheet is represented by t1 in unit mm, and a sheet thickness of the second aluminum-plated steel sheet is represented by t2 in unit mm, in a case in which the t1 is equal to the t2, the t may be 80% or more of the t1; and in a case in which the t1 is different from the t2, the t may be 80% or more of smaller of the t1 and the t2.

(5) In the tailored blank for hot stamping according to any one of the above-described (1) to (4), in a case in which the t1 that is the sheet thickness of the first aluminum-plated steel sheet is equal to the t2 that is the sheet thickness of the second aluminum-plated steel sheet, a maximum height of the weld metal may be 300 μm or shorter from an extended line of a surface of the first aluminum-plated steel sheet; and in a case in which the t1 is different from the t2, a maximum height of the weld metal may be 300 μm or shorter from an extended line of a surface of thicker of the first aluminum-plated steel sheet and the second aluminum-plated steel sheet.

(6) In the tailored blank for hot stamping according to any one of the above-described (1) to (5), an oxygen content in the weld metal may be 50 ppm or more higher than an average oxygen content in a first steel sheet that is a base material for plating of the first aluminum-plated steel sheet and a second steel sheet that is a base material for plating of the second aluminum-plated steel sheet.

(7) According to a second aspect of the present invention, there is provided a method for manufacturing a tailored blank for hot stamping in which butt welding is performed using a first aluminum-plated steel sheet and a second aluminum-plated steel sheet, including determining welding conditions so that an average Al concentration of a weld metal in a welded portion falls in a range of 0.3 mass % to 1.5 mass %, and an $Ac_3$ point (° C.) of the weld metal defined by the following formula (1) is 1250° C. or lower; and forming an aluminum layer derived from aluminum-plated layers of the first aluminum-plated steel sheet and the second aluminum-plated steel sheet on a surface of the weld metal in the welded portion by performing welding under the welding conditions.

[Expression 4]

$Ac_3 = 910 - 230 \times C^{0.5} - 15.2 \times Ni + 44.7 \times Si + 104 \times V + 31.5 \times Mo + 13.1 \times W - 30 \times Mn - 11 \times Cr - 20 \times Cu + 700 \times P + 400 \times Al + 120 \times As + 400 \times Ti$  Formula(1)

Here, C, Ni, Si, V, Mo, W, Mn, Cr, Cu, P, Al, As, and Ti in the formula represent amounts of individual elements in the weld metal in mass %. In addition, elements not contained are considered to have an amount of zero in computation.

(8) In the method for manufacturing a tailored blank for hot stamping according to the above-described (7), when determining the welding conditions, furthermore, the welding conditions may be determined so that $\Delta t_M$ defined by the following formula (2) in unit second is 0.5 seconds or longer.

[Expression 5]

$$\Delta t_M = \exp\left\{10.6\left(C + \frac{Si + 5 \times Al}{24} + \frac{Mn}{6} + \frac{Cu}{15} + \frac{Ni}{12} + \frac{Mo}{6} + \frac{Cr \times (1 - 0.16 \times \sqrt{Cr})}{8} + \Delta H\right) - 4.8\right\}$$  Formula (2)

Here, C, Si, Al, Mn, Cu, Ni, Mo, and Cr in the formula represent amounts of individual elements in the weld metal in mass %, and elements not contained are considered to have an amount of zero in computation. In addition, ΔH in the formula represents a numeric value defined as described below in accordance with the amount of B in mass % and fN when the fN is set to (0.02−N)/0.02 using the amount of N in the weld metal in mass %.

When B≤0.0001, ΔH=0,
When 0.0001<B≤0.0002, ΔH=0.03×fN,
When 0.0002<B≤0.0003, ΔH=0.06×fN, and
When 0.0003<B, ΔH=0.09×fN.

(9) In the method for manufacturing a tailored blank for hot stamping according to the above-described (7) or (8), furthermore, when determining the welding conditions, the welding conditions may be determined so that an $Ac_1$ point defined by the following formula (3) in unit ° C. is 860° C. or lower.

[Expression 6]

$Ac_1 = \exp(6.5792 - 0.038058 \times C + 0.052317 \times Si + 0.011872 \times Ni - 0.045575 \times V + 0.18057 \times Al + 0.011442 \times W - 0.013403 \times Cu + 5.5207 \times B + 0.91209 \times S - 1.1002 \times P + 0.060014 \times Mn \times C - 0.096628 \times Cr \times C + 0.050625 \times Cr \times Si + 0.39802 \times Mo \times C - 0.34782 \times Mo \times Mn + 0.40986 \times Mo \times Si - 0.12959 \times Mo \times Cr - 0.048128 \times Ni \times C - 0.01090 \times Mn^2 - 0.03550 \times Si^2 + 0.010207 \times Cr^2 + 0.36074 \times Mo^2 - 0.0030705 \times Ni^2)$  Formula (3)

Here, C, Si, Ni, V, Al, W, Cu, B, S, P, Mn, Cr, and Mo in the formula represent the amounts, in mass %, of individual elements in the weld metal, and elements not contained are considered to have a content of zero in computation.

(10) In the method for manufacturing a tailored blank for hot stamping according to any one of the above-described (7) to (9), furthermore, when determining the welding conditions, the welding conditions may be determined so that, when a thickness of a thinnest portion of the weld metal is represented by t in unit mm, a sheet thickness of the first aluminum-plated steel sheet is represented by t1 in unit mm, and a sheet thickness of the second aluminum-plated steel sheet is represented by t2 in unit mm, in a case in which the t1 is equal to the t2, the t is 80% or more of the t1; and in a case in which the t1 is different from the t2, the t is 80% or more of smaller of the t1 and the t2.

(11) In the method for manufacturing a tailored blank for hot stamping according to any one of the above-described (7) to (10), furthermore, when determining the welding conditions, the welding conditions may be determined so that, in a case in which the t1 that is the sheet thickness of the first aluminum-plated steel sheet is equal to the t2 that is the sheet thickness of the second aluminum-plated steel sheet, a maximum height of the weld metal is 300 μm or shorter from an extended line of a surface of the first aluminum-plated steel sheet; and in a case in which the t1 is different from the t2, a maximum height of the weld metal is 300 μm or shorter from an extended line of a surface of thicker of the first aluminum-plated steel sheet and the second aluminum-plated steel sheet.

(12) In the method for manufacturing a tailored blank for hot stamping according to any one of the above-described (7) to (11), when determining the welding conditions, the welding conditions may be determined so that an oxygen content in the weld metal is 50 ppm or more higher than an average oxygen content in a steel sheet that is a base material for plating of the first aluminum-plated steel sheet and the second aluminum-plated steel sheet.

(13) In the method for manufacturing a tailored blank for hot stamping according to any one of the above-described (7) to (12), the butt welding may be any one of laser welding, electron beam welding, and plasma welding.

(14) In the method for manufacturing a tailored blank for hot stamping according to any one of the above-described (7) to (13), the butt welding may be laser welding performed while supplying a filler wire.

(15) According to a third aspect of the present invention, there is provided a hot-stamped member obtained by performing hot stamping on the tailored blank for hot stamping according to any one of the above-described (1) to (6), in which a product of a hardness of the weld metal and a thickness of a thinnest portion of the weld metal is greater than both a product of a hardness of the first aluminum-plated steel sheet and a sheet thickness of the first aluminum-plated steel sheet and a product of a hardness of the second aluminum-plated steel sheet and a sheet thickness of the second aluminum-plated steel sheet.

(16) According to a fourth aspect of the present invention, there is provided a method for manufacturing a hot-stamped member including performing hot stamping on the tailored blank for hot stamping according to any one of the above-described (1) to (6), in which, after the hot stamping, a product of a hardness of the weld metal and a thickness of a thinnest portion of the weld metal is set to be greater than both a product of a hardness of the first aluminum-plated steel sheet and a sheet thickness of the first aluminum-plated steel sheet and a product of a hardness of the second aluminum-plated steel sheet and a sheet thickness of the second aluminum-plated steel sheet.

Effects of the Invention

According to the present invention, it is possible to provide a tailored blank for hot stamping having a high joint strength after hot stamping even when an aluminum-plated steel sheet is butt-welded without removing a plated layer in a portion to be welded.

In addition, according to the present invention, it is possible to provide a hot-stamped member having a high joint strength after hot stamping even when a tailored blank for hot stamping obtained by performing butt welding on an aluminum-plated steel sheet without removing a plated layer in a portion to be welded is used.

Furthermore, since the surfaces of the weld beads of the above-described tailored blank for hot stamping and hot-stamped member are covered with aluminum, it is possible to solve the problem of the occurrence of the decarburization or oxidization of the weld metal during hot stamping or the problem of poor corrosion resistance after hot stamping.

EMBODIMENTS OF THE INVENTION

Hereinafter, a tailored blank for hot stamping according to an embodiment of the present invention (hereinafter, in some cases, referred to as the tailored blank according to the embodiment), a method for manufacturing the same, a hot-stamped member according to an embodiment of the present invention (hereinafter, in some cases, referred to as the hot-stamped member according to the embodiment), and a method for manufacturing the same will be described.

1. Tailored Blank for Hot Stamping (The Average Al Concentration of a Weld Metal: 0.3 Mass % to 1.5 Mass %)

The tailored blank according to the embodiment is obtained by joining multiple aluminum-plated steel sheets through butt welding, and a welded portion containing a weld metal is present in a butt-welded portion.

In the tailored blank according to the embodiment, it is important to control the movement of aluminum into the weld metal from a plated coat within an appropriate range as described below to ensure the joint strength after hot stamping by suppressing the decarburization or oxidization of the weld metal during hot stamping, and furthermore, to ensure the corrosion resistance after hot stamping. To control the movement of aluminum into the weld metal from the plated coat, it is important to set the average Al concentration in the weld metal in a range of 0.3 mass % to 1.5%.

Figure 1:
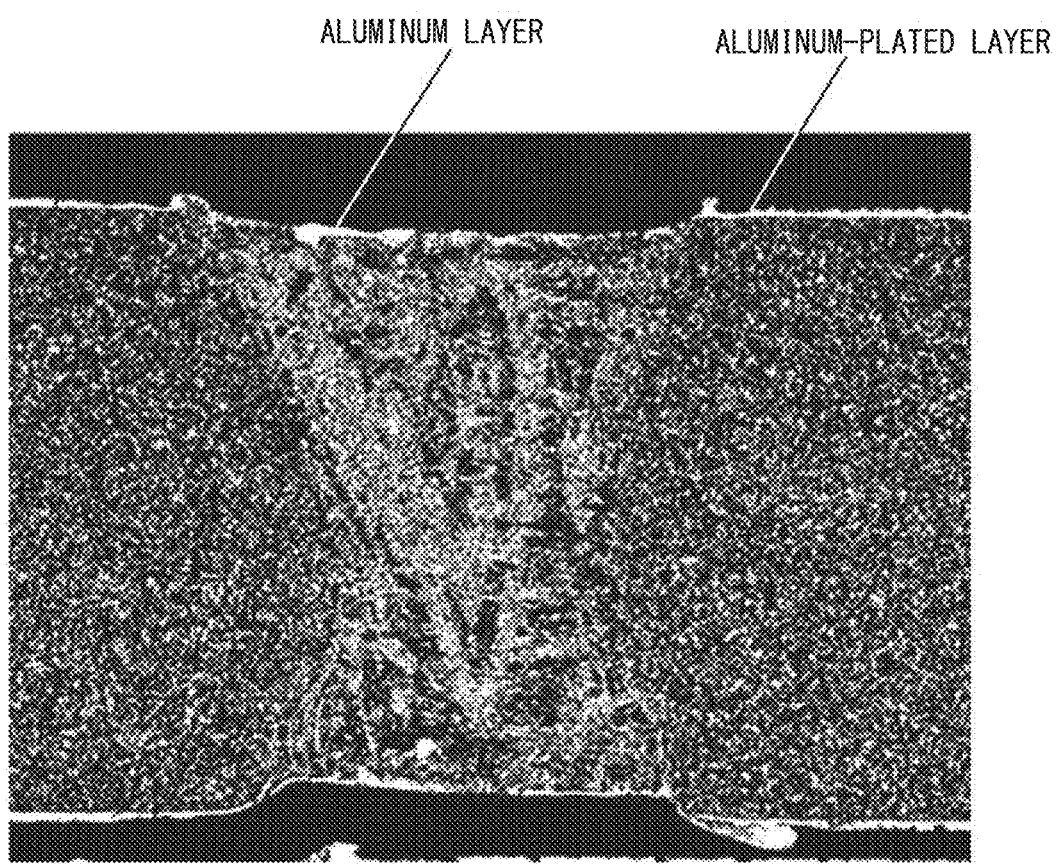
FIG. 1 is a photograph showing an example of a cross-section of a welded portion formed by performing butt laser welding on an aluminum-plated steel sheet.

The inventors found that, in a tailored blank for hot stamping obtained by butt-welding an aluminum-plated steel sheet without removing a plated layer in a portion to be welded, when the average Al concentration in the weld metal is set to a certain value or more by moving and concentrating aluminum into the weld metal from a plated coat, it is possible to form an aluminum layer on the surface of the weld metal. That is, it was found that the surface of the weld metal (weld bead) is covered with an aluminum layer formed during the butt welding as illustrated in FIG. 1. In addition, it was newly found that, since the surface of the weld metal is covered with the aluminum layer, it is possible to solve the problem of the occurrence of the decarburization or oxidization of the weld metal during hot stamping or the problem of a member obtained through hot stamping (hot-stamped member) having poor corrosion resistance. The reason for the above-described fact is not clear, but is considered that, during butt welding, a plating metal (aluminum) melted in a heat-affected zone is drawn into the flow in the molten pool of the weld bead, and the plating metal having a lower melting point than steel spreads on the surface of the weld bead even after the solidification of the molten pool, thereby covering the weld bead.

When the average Al concentration in the weld metal is less than 0.3 mass %, the movement and concentration of aluminum into the welding metal from the plated coat is not sufficient, and it is not possible to sufficiently form an aluminum layer on the surface of the weld metal. Therefore, it is not possible to solve the problem of the occurrence of the decarburization or oxidization of the weld metal during hot stamping or the problem of a member obtained through hot stamping having poor corrosion resistance. Therefore, in the embodiment, the average Al concentration in the weld metal is set to 0.3 mass % or more.

On the other hand, in the tailored blank for hot stamping obtained by butt-welding an aluminum-plated steel sheet without removing a plated layer in a portion to be welded, when the movement and concentration of aluminum into the weld metal from the plated coat are appropriately controlled, it is possible to quench the weld metal during a cooling process in a butt welding process that is a process before hot stamping. In this case, it becomes possible to increase the strength of the weld metal in advance before a hot stamping process. That is, even when the weld metal is not quenched in the hot stamping process, or the weld metal is tempered in the hot stamping process, it is possible to ensure a sufficient joint strength after hot stamping (in a hot-stamped member). On the other hand, in a case in which aluminum excessively moves and concentrates into the weld metal from the plated coat, the average Al concentration in the weld metal becomes too high. Since Al is a ferrite former, when the average Al concentration in the weld metal becomes too high, austenite is not generated during the cooling process in the butt welding process that is a process before hot stamping, and the weld metal is not sufficiently quenched during the cooling process in the welding process. Therefore, it is not possible to achieve the high strengthening of the weld metal, and it becomes impossible to ensure a sufficient joint strength after hot stamping. When the movement and concentration of aluminum into the weld metal from the plated coat are appropriately suppressed, it is possible to ensure a sufficient joint strength after hot stamping.

When the average Al concentration in the weld metal exceeds 1.5 mass %, it is not possible to ensure a sufficient joint strength after hot stamping for the above-described reason. Therefore, the average Al concentration in the weld metal is set to 1.5 mass % or less. When the average Al concentration in the weld metal is set to 1.5 mass % or less, it is possible to obtain a hardened structure such as a martensite structure or a martensite and bainite structure by quenching the weld metal during the cooling process in the butt welding process that is a process before hot stamping.

(The $Ac_3$ Point of the Weld Metal: 1250° C. or Lower)

The inventors found that, even when the average Al concentration in the weld metal is 1.5 mass % or less, in the chemical composition of the welding material, in a case in which the C or Mn content is small, and the Si content is great, it becomes difficult to increase the strength of the weld metal in advance by quenching during the cooling process in the butt welding process that is a process before hot stamping, that is, it becomes difficult to ensure a sufficient joint strength after hot stamping. Regarding the above-described fact, the inventors conducted intensive studies. As a result, it was confirmed that, when the $Ac_3$ point (° C.) defined by the following formula (1) is set to 1250° C. or lower, it becomes possible to increase the strength of the weld metal in advance by quenching the weld metal during the cooling process in the butt welding process that is a process before hot stamping. That is, it was experimentally confirmed that, when the $Ac_3$ point is set to 1250° C. or lower, a sufficient joint strength can be ensured after hot stamping even when the weld metal is not quenched in the hot stamping process, or the weld metal is tempered in the hot stamping process.

In a case in which the $Ac_3$ point of the weld metal defined by the formula (1) is higher than 1250° C., it becomes difficult to quench the weld metal during the cooling process in the butt welding process that is a process before hot stamping, and therefore it becomes difficult to ensure a sufficient joint strength after hot stamping. Therefore, the $Ac_3$ point of the weld metal defined by the formula (1) is set to 1250° C. or lower.

[Expression 7]

$$Ac_3 = 910 - 230 \times C^{0.5} - 15.2 \times Ni + 44.7 \times Si + 104 \times V + 31.5 \times Mo + 13.1 \times W - 30 \times Mn - 11 \times Cr - 20 \times Cu + 700 \times P + 400 \times Al + 120 \times As + 400 \times Ti \qquad \text{Formula(1)}$$

Here, the element symbols in the formula (C, Ni, Si, V, Mo, W, Mn, Cr, Cu, P, Al, As, and Ti) represent the amounts (mass %) of individual elements in the weld metal. In addition, elements not contained are considered to have an amount of zero in computation.

The formula of the $Ac_3$ point is a formula well known by a document ("The Physical metallurgy of Steels" authored by Leslie. W. C, translated and edited by Kouda Shigeyasu, published by Maruzen Company, Limited (1985), p. 273).

Since a lower $Ac_3$ point is more advantageous for the quenching during the cooling process in the butt welding process that is a process before hot stamping, the lower limit of the $Ac_3$ point is not particularly specified.

($\Delta t_M$ of the Weld Metal: 0.5 Seconds or Longer)

As described above, to ensure a sufficient joint strength after hot stamping, it is important to increase the strength of the weld metal in advance by quenching during the cooling process in the butt welding process that is a process before hot stamping. To increase the strength of the weld metal in advance by quenching, it is preferable to increase the hardenability of the weld metal in addition to the control of the $Ac_3$ point.

$\Delta t_M$ defined by the following formula (2) is the index of hardenability indicating the threshold cooling time (seconds) at which the structure of the weld metal fully becomes martensite by cooling. A higher value of $\Delta t_M$ indicates a greater ease of quenching. The formula (2) is described in, for example, a document (Kasuya and Hashiba, Nippon Steel Technical Report No. 385, p. 48 to 55 (2006)).

When $\Delta t_M$ defined by the following formula (2) is set to 0.5 seconds or longer, it is possible to increase the strength of the weld metal in advance by quenching during the cooling process in the butt welding process that is a process before hot stamping. In addition, an increase in the strength of the weld metal facilitates the ensuring of a sufficient joint strength after hot stamping. Therefore, in the tailored blank according to the embodiment, $\Delta t_M$ of the weld metal defined by the formula (2) is preferably set to 0.5 seconds or longer. $\Delta t_M$ is more preferably set to 1.0 second or longer. Since a longer $\Delta t_M$ leads to a higher hardenability, it is not necessary to particularly limit the upper limit of $\Delta t_M$.

[Expression 8]

$$\Delta t_M = \exp\left\{10.6\left(C + \frac{Si + 5 \times Al}{24} + \frac{Mn}{6} + \frac{Cu}{15} + \frac{Ni}{12} + \frac{Mo}{6} + \frac{Cr \times (1 - 0.16 \times \sqrt{Cr})}{8} + \Delta H\right) - 4.8\right\} \qquad \text{Formula (2)}$$

Here, the respective element symbols (C, Si, Al, Mn, Cu, Ni, Mo, and Cr) represent the contents (mass %) of the elements in the weld metal, and elements not contained are considered to have a content of zero in computation. In addition, ΔH in the formula represents a numeric value defined as described below in accordance with the amount of B in mass % when the fN is set to (0.02−N)/0.02 using the amount of N in the weld metal in mass %.

When B≤0.0001, ΔH=0,
When 0.0001<B≤0.0002, ΔH=0.03×fN,
When 0.0002<B≤0.0003, ΔH=0.06×fN, and
When 0.0003<B, ΔH=0.09×fN.

(The $Ac_1$ Point of the Weld Metal: 860° C. or Lower)

As described above, when the movement and concentration of aluminum into the weld metal from the plated coat are accelerated, the $Ac_3$ point of the weld metal reaches a high temperature, and therefore it becomes difficult to set the $Ac_3$ point of the weld metal to the heating temperature or lower during the hot stamping process. However, it is possible to set the $Ac_1$ point of the weld metal to the heating temperature or lower during the hot stamping process. When the $Ac_t$ point is set to the heating temperature or lower during the hot stamping process, it becomes possible to achieve the high strengthening of the weld metal by quenching in the hot stamping process. Therefore, it becomes possible to ensure a stronger joint strength after hot stamping. Therefore, the $Ac_t$ point of the weld metal defined by the following formula (3) is preferably 860° C. or lower.

[Expression 9]

$$Ac_1 = \exp(6.5792 - 0.038058 \times C + 0.052317 \times Si + 0.011872 \times Ni - 0.045575 \times V + 0.18057 \times Al + 0.011442 \times W - 0.013403 \times Cu + 5.5207 \times B + 0.91209 \times S - 1.1002 \times P + 0.060014 \times Mn \times C - 0.096628 \times Cr \times C + 0.050625 \times Cr \times Si + 0.39802 \times Mo \times C - 0.34782 \times Mo \times Mn + 0.40986 \times Mo \times Si - 0.12959 \times Mo \times Cr - 0.048128 \times Ni \times C - 0.01090 \times Mn^2 - 0.03550 \times Si^2 + 0.010207 \times Cr^2 + 0.36074 \times Mo^2 - 0.0030705 \times Ni^2)$$

Formula (3)

Here, the respective element symbols (C, Si, Ni, V, Al, W, Cu, B, S, P, Mn, Cr, and Mo) represent the amounts (mass %) of the elements in the weld metal, and elements not contained are considered to have an amount of zero in computation.

Since a lower $Ac_1$ point is more advantageous for the quenching in the hot stamping process, the lower limit of the $Ac_1$ point is not particularly specified.

(Shape of the Weld Metal)

In butt-welding performed with the shear-cut edge surfaces of a steel sheets (aluminum-plated steel sheet) brought face-to-face each other, it is normal to weld the edge surface with a weld bead having a surface in a state of being concave (locally necked) with respect to the steel sheet surface in consideration of the cutting precision of the edge surface. In this case, the thickness of the thinnest portion of the weld metal of the tailored blank according to the embodiment is preferably set to be 80% or more of the sheet thickness of the butt-welded aluminum-plated steel sheet. Then, it is possible to increase the strength of a welded joint section (the thinner sheet thickness in a case in which the sheet thicknesses are different). The thickness of the thinnest portion of the weld metal is more preferably set to be 90% or more of the sheet thickness (the thinner sheet thickness in a case in which the sheet thicknesses are different) of the butt-welded aluminum-plated steel sheet. The thickness of the thinnest portion of the weld metal in the embodiment refers to the thickness of the thinnest portion of the portions that are fully made of the weld metal in the sheet thickness direction in the steel sheet.

To increase the thickness of the weld metal, for example, the locally-necked portion may be filled using a filler metal such as a filler wire. However, in a case in which the thickness of the weld metal is increased by performing the butt welding on the edge surface of the steel sheet using a filler metal such as a filler wire for the purpose of improving the joint strength, the maximum height of the surface of the weld metal is preferably set to 300 μm or shorter from an extended line of the surface (the thicker surface in a case in which the sheet thicknesses are different) of the butt-welded aluminum-plated steel sheet. Then, it is possible to more reliably bring the vicinity of the welded portion in the tailored blank for hot stamping and a die into contact with each other during hot stamping. Therefore, it is possible to more reliably perform the quenching of the vicinity of the welded portion in the tailored blank for hot stamping through the heat transfer of the die.

(The Oxygen Content of the Weld Metal)

The oxygen content in the weld metal for the tailored blank according to the embodiment is preferably set to 50 ppm or more higher than the average oxygen content in the steel sheet that is a base material for plating of the butt-welded aluminum-plated steel sheet. Then, while the detailed mechanism is not clear, the block size of martensite in the weld metal becomes small, and the toughness of the weld metal improves. To increase the oxygen content of the weld metal, it is possible to use, for example, a metal cored wire in welding. In a case in which the metal cored wire is used, the oxygen content varies depending on the supply amount of the metal cored wire, and therefore the metal cored wire may be supplied in an amount in accordance with the intended oxygen content. The upper limit of the difference between the oxygen content in the weld metal and the average oxygen content of the steel sheet that is the base material for plating for the butt-welded aluminum-plated steel sheet is not particularly limited, but is preferably set to 300 ppm or less from the viewpoint of suppressing the formation of an coarse oxide.

(Aluminum-Plated Steel Sheet)

The aluminum-plated steel sheet used for the tailored blank according to the embodiment is not particularly limited. For example, as the aluminum-plated steel sheet offered for the butt welding to obtain the tailored blank according to the embodiment, steel sheets of the same kind may be used, but steel sheets having different characteristics such as strength may be used for the purpose of providing different characteristics to individual portions.

In a case in which the aluminum-plated steel sheet is applied to a portion in which the improvement of the mechanical characteristics by the quenching of hot stamping is required, an aluminum-plated steel sheet including as the base material, for example, a steel sheet having a chemical composition containing by mass % C: 0.15% to 0.25%, Si: 0.1% to 0.35%, Mn: 0.8% to 1.8%, Cr: 0.01% to 0.5%, B: 0.1% or less (including 0%) with a remainder of Fe and impurities or a steel sheet having a chemical composition further containing one or more of Ti, Nb, and Mo on the basis of the above-described chemical composition may be used.

It is not necessary to particularly specify the strength of the aluminum-plated steel sheet to be butt-welded, which is used for the tailored blank according to the embodiment, from the viewpoint of the strength after hot stamping. However, when the workability such as blanking before butt welding is taken into account, the tensile strength before hot stamping is preferably in a range of 270 MPa to 590 MPa.

The range of the sheet thickness of the aluminum-plated steel sheet to be butt-welded, which is used for the tailored blank according to the embodiment, is, for example, 0.8 mm to 4.0 mm, and is preferably 0.8 mm to 2.0 mm.

The aluminum-plated layer in the aluminum-plated steel sheet prevents the corrosion of the steel sheet, and prevents the generation of a scale (an oxide of iron) generated by the oxidization of the surface of the steel sheet heated to a high temperature during the hot stamping of the steel sheet. Since the aluminum-plated layer has a higher boiling point and the like than a plated coat of an organic material or plated coats of other metallic materials (for example, Zn-based material), when formed using a hot stamping method, it becomes possible to process the aluminum-plated layer at a high temperature. Therefore, the above-described characteristic is advantageous from the viewpoint of the quenching of the welding material in the hot stamping process. From the above-described viewpoint, it is preferable to form the aluminum-plated layer on both surfaces of the steel sheet.

The aluminum-plated layer may be formed on the surface of the steel sheet using, for example, a hot dip coating method. Any plated layers may be used as long as the plated layer contains a main component of Al. There is no particular limitation regarding components other than Al. For example, the plated layer may contain 3 mass % to 15 mass % of Si. When the Si content is set to 3 mass % or more, it is possible to control an alloy layer generated during the coating of a hot dip coating metal. On the other hand, when the Si content is set to 15% or less, it is possible to ensure favorable workability and corrosion resistance in the plated layer.

2. Method for Manufacturing a Tailored Blank for Hot Stamping (The Method for Adjusting the Chemical Composition of the Weld Metal)

As described above, in the tailored blank for hot stamping obtained by butt-welding an aluminum-plated steel sheet without removing the plated layer in a portion to be welded, a $Ac_3$ point of the weld metal becomes high due to the movement and concentration of aluminum into the weld metal from the plated coat during the butt welding. As a result, there is a case in which it becomes difficult to increase the strength by quenching the weld metal in the hot stamping process, or the strength is decreased due to tempering.

Therefore, in the method for manufacturing a tailored blank according to the embodiment, welding is performed after the conditions are adjusted so that the average Al concentration of the weld metal is in a range of 0.3 mass % to 1.5 mass %, and the $Ac_3$ point (° C.) of the weld metal defined by the above-described formula (1) is 1250° C. or lower (welding condition-determining process: S1). In this case, since it becomes possible to increase the strength of the weld metal in advance by quenching during the cooling process in the butt welding process that is a process before hot stamping, it is possible to ensure a sufficient joint strength after hot stamping even when the weld metal is not quenched in the hot stamping process, or the weld metal is tempered in the hot stamping process.

Furthermore, in the method for manufacturing a tailor blank according to the embodiment, an aluminum layer derived from the aluminum-plated layer in the aluminum-plated steel sheet to be welded is formed on the surface of the weld metal (welding process: S2).

Here, the average Al concentration of the weld metal can be computed by computing the Al content incorporated into the weld metal from the plated layer using the widths of the weld beads and the thicknesses of the plated layers on the front and back of the aluminum-plated layer, the groove intervals, and the like, estimating the Al content incorporated from the steel sheet, which is a base material for plating, or the Al content incorporated from a filler metal in a case in which the filler metal is used, and using the above-described values and the cross-sectional area of the weld metal. That is, the average Al concentration can be estimated from the chemical composition of the aluminum-plated steel sheet, the coating weight, the sheet thickness, the groove intervals, the chemical composition of the filler metal, and the like. Therefore, it is possible to control the average Al concentration of the weld metal by determining the welding conditions in consideration of the above-described facts.

For example, to set the average Al concentration of the weld metal to 1.5 mass % or less without using a filler metal, it is possible to use a steel sheet having a sheet thickness in a range of 0.8 mm to 2.0 mm in a case in which a double-sided aluminum-plated steel sheet having a coating weight of 40/40 gr/m² is butt-welded with groove intervals of 0.2 mm or 0.4 mm. In addition, it is possible to use a steel sheet having a sheet thickness in a range of 1.4 mm to 4.0 mm in a case in which a double-sided aluminum-plated steel sheet having a coating weight of 80/80 gr/m² is butt-welded with groove intervals of 0.2 mm or 0.4 mm. It is preferable to set the sheet thickness of the aluminum-plated steel sheet to 3.0 mm or less in a case in which a double-sided aluminum-plated steel sheet having a coating weight of 80/80 gr/m² is butt-welded with groove intervals of 0.2 mm or 0.4 mm.

In a case in which the coating weight of the plate is great, depending on the sheet thickness of the steel sheet as well, there is a case in which it is difficult to set the average Al concentration of the weld metal to 1.5 mass % or less. In such a case, it is preferable to form gaps in the butt portion of the steel sheet and dilute Al by filling the gaps with the weld metal using a filler metal such as a filler wire during welding. Then, the amount of the weld metal increases, and it is possible to set the Al concentration of the weld metal to 1.5 mass % or less. A powder-form filler metal or a wire-form filler metal can be used; however, from the viewpoint of the yield, it is suitable to supply the filler metal in the wire-form filler metal, that is, a filler wire.

The $Ac_3$ point (° C.) of the weld metal defined by the above-described formula (1), $\Delta t_M$ (seconds) defined by the above-described formula (2), and the $Ac_1$ point (° C.) of the weld metal defined by the above-described formula (3) can also be estimated using the same method as the control of the average Al concentration. When welding is performed under welding conditions in which the chemical composition of the aluminum-plated steel sheet, the coating weight, the sheet thickness, the groove intervals, the chemical composition of the filler metal, and the like are adjusted based on the above-described estimation, it is possible to easily set the $Ac_3$ point (° C.) to 1250° C. or lower, $\Delta t_M$ (seconds) to 0.5 seconds or longer, and the $Ac_1$ point (° C.) to 860° C. or lower.

Specifically, it is preferable to estimate the filler metal components and the filler metal supply amount in the following order, and to experimentally confirm the filler metal components and the filler metal supply amount using the estimated components and the estimated supply amount.

(i) First, the weld bead shape is estimated from the sheet thickness, groove intervals, and welding heat input amount of the aluminum-plated steel sheet to be welded. The melting widths of the plated layer are obtained from the estimated widths of the weld beads on the front and back of the steel sheet, and the Al content weld-penetrated from the plated layer into the weld metal forming the weld bead is estimated based on the melting width and the plate thickness. In addition, an amount of the weld metal content is obtained from the estimated weld bead shape, and the components of the weld metal are estimated from the components (chemical components) of the aluminum-plated steel sheet to be welded, the composition of the filler wire to be used, and the Al content weld-penetrated into the weld metal.

(ii) Next, the estimated components of the weld metal are investigated, and whether or not the components are suitable for the above-described conditions (the average Al concentration, the $Ac_3$ point, and the like) is determined. In a case in which the components are not suitable, the composition of the filler wire is changed, and then whether or not the components are suitable for the above-described conditions is determined.

(iii) In a case in which the components become suitable for the above-described conditions by the change of the composition of the filler wire, the filler wire is changed to a wire having the new components. In a case in which the components are not suitable for the above-described conditions even after the change of the composition of the filler wire, the amount of the weld metal content is increased by changing the groove intervals. In addition, the components of the weld metal after the change of the groove intervals are estimated in the order of the above-described (i), and whether or not the weld metal is suitable for the above-described conditions is determined.

Thus far, a case in which the components or supply amount of the filler wire are adjusted with attention paid to the components of the weld metal has been described, but the components or supply amount of the filler wire can be adjusted by, regarding the relationship between the hardness of the base metal steel sheet and the hardness of the weld metal as well, estimating whether or not the relationship between the hardness of the base metal steel sheet and the hardness of the weld metal satisfies the below-described conditions using a method for estimating the hardness Hv (BM) of the steel sheet and the hardness Hv (WM) of the weld metal after hot stamping.

As described above, the use of the filler metal enables the adjustment of the $Ac_3$ point (° C.), $\Delta t_M$ (seconds), and the $Ac_1$ point (° C.) not only by diluting Al but also by adjusting the chemical composition, the supply amount, or the like. Furthermore, the use of the filler metal also enables the improvement of the joint strength by increasing the thickness of the weld metal or the control of the shape. As described above, the thickness of the thinnest portion of the weld metal for the tailored blank according to the embodiment is preferably set to be 80% or more of the sheet thickness (the thinner sheet thickness in a case in which the sheet thicknesses are different) of the butt-welded aluminum-plated steel sheet. Therefore, an increase in the thickness of the weld metal using the filler metal is preferable from the viewpoint of improving the joint strength. However, the maximum height of the surface of the weld metal is preferably set to 300 μm or shorter from an extended line of the surface (the thicker surface in a case in which the sheet thicknesses are different) of the butt-welded aluminum-plated steel sheet since the vicinity of the welded portion in the tailored blank for hot stamping is more reliably quenched.

From the viewpoint of increasing the hardenability of the weld metal, it is advantageous to supply carbon (C) or an element increasing the hardenability from the filler metal to the weld metal. However, a solid wire having a high content of C or an alloy element is difficult to manufacture, and therefore a cored wire having a steel outer coat filled with carbon powder or metal powder (also called a metal cored wire since it does not contain a flux) is preferably used as the filler metal for the ease of use. Since the metal cored wire is filled with carbon powder or metal powder, the use of the metal cored wire facilitates the supply of C and the like to the weld metal. When welding is performed using the cored wire containing carbon powder, and the C content in the weld metal is made to be greater than the C content of the base metal, it is possible to make the hardness of the weld metal higher than the hardness of the base metal. A hot-stamped member including the above-described weld metal is preferable since, even when the hot-stamped member is significantly deformed due to an impact or the like, the joint portion does not preferentially fracture, and therefore a more sufficient joint strength can be ensured.

In the metal cored wire, metal powder having a great specific surface area such as iron powder is used. Since oxygen is adsorbed onto the surface of the metal powder, it is possible to increase the oxygen content in the weld metal by performing welding using the metal cored wire. As described above, the oxygen content in the weld metal is preferably set to 50 ppm or more higher than the average oxygen content in the steel sheet that is a base material for plating of the butt-welded aluminum-plated steel sheet. The detailed mechanism is not clear, but an increase in the oxygen content in the weld metal decreases the block size of martensite in the weld metal, and the toughness of the weld metal improves. Since the oxygen content varies depending on the supply amount of the metal cored wire, it is possible to set the oxygen content in the weld metal to 50 ppm or more higher than the average oxygen content in the steel sheet that is a base material for plating of the butt-welded aluminum-plated steel sheet by adjusting the supply amount of the metal cored wire in accordance with the intended oxygen content.

(Welding Method)

As described above, in the tailored blank for hot stamping obtained by butt-welding an aluminum-plated steel sheet without removing a plated layer in a portion to be welded, the $Ac_3$ point of the weld metal is made to reach a high temperature by moving and concentrating aluminum into the weld metal from the plated coat during welding, and it becomes difficult to increase the strength by quenching the weld metal in the hot stamping process. However, when the strength of the weld metal is increased in advance by quenching during the cooling process in the butt welding process that is a process before hot stamping, it is possible to ensure a sufficient joint strength after hot stamping even when the weld metal is not quenched in the hot stamping process or the weld metal is tempered in the hot stamping process. Therefore, the welding method being used is preferably a welding method in which the weld penetration width of the steel sheet is small, and the cooling rate after welding is fast. Examples of welding methods capable of the above-described welding include welding methods in which the energy density is high, and a heat source capable of intensively heating a narrow region is used such as laser welding, plasma welding, and electron beam welding. Among the above-described welding methods, the laser welding method is most suitable. In the laser welding method, there is no particular limitation regarding the type and the like of a laser oscillator, and welding may be performed with a laser output in accordance with the sheet thickness of a steel sheet being used. At this time, it is also possible to supply the filler wire and perform welding as described above.

Figure 2:
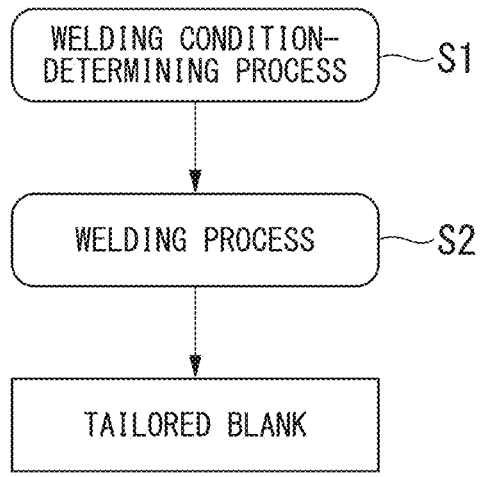
FIG. 2 is a flowchart showing an example of a method for manufacturing a tailored blank according to the present embodiment.

FIG. 2 illustrates an example of the method for manufacturing the above-described tailored blank for hot stamping.

3. Hot-Stamped Member (The Hardness of the Weld Metal after Hot Stamping)

A hot-stamped member according to the embodiment can be obtained by performing hot stamping on the tailored blank for hot stamping according to the embodiment. In a case in which the hot-stamped member is assembled into an automobile as a structural member, the hot-stamped member is required to remain unfractured at the weld bead even when significantly deformed by an impact, and to exhibit favorable deformability, energy-absorbing characteristics, and proof stress.

To satisfy the above-described requirements, the strength of the welded portion in the hot-stamped member is required to be higher than the strengths of any portions in the hot-stamped well-butted aluminum-plated steel sheet.

That is, to satisfy what has been described above, in the hot-stamped member, the product of the hardness Hv (WM) of the weld metal after hot stamping and the thickness t (WM) of the thinnest portion of the weld metal is required to be greater than any one of the product of the hardness Hv1 (BM) and the sheet thickness t1 (BM) of one butt-welded aluminum-plated steel sheet after hot stamping and the product of the hardness Hv2 (BM) and the sheet thickness t2 (BM) of the other butt-welded aluminum-plated steel sheet after hot stamping, that is, is required to satisfy $$Hv(WM) \times t(WM) > \min\{Hv1(BM) \times t1(BM), Hv2(BM) \times t2(BM)\}.$$

Here, the hardness of the weld metal is the average of three measured values of Vickers hardness obtained by removing the maximum value and the minimum value from values measured at five points on the bead cross-section of the central portion in the sheet thickness direction, and the hardness of the steel sheet is the average of Vickers hardness values measured at three points on the cross-section in the same manner. In addition, the above-described min{ } represents a function returning the minimum value out of arguments.

When the $Ac_3$ point of the weld metal is increased due to the movement and concentration of aluminum into the weld metal from the plated coat, there is a case in which the weld metal does not transform in to austenite during heating in hot stamping, and is tempered and softened. In such as a case as well, it is possible to satisfy Hv (WM)×t (WM)>min{Hv1 (BM)×t1 (BM), Hv2 (BM)×t2 (BM)} by selecting the combination of a steel sheet to be welded, welding conditions, and the like. Then, the hot-stamped member exhibits sufficient functions as a structural member of an automobile.

The manufacturing conditions for manufacturing the tailored blank for hot stamping, in which a hot-stamped member satisfying the above-described conditions can be obtained, can be experimentally obtained by performing hot stamping on a tailored blank for hot stamping produced for test purposes, and repeating the verification of the obtained hot-stamped member. Furthermore, it is also possible to estimate whether or not the tailored blank satisfies the above-described conditions by estimating the hardness Hv (BM) of the hot-stamped steel sheet and the hardness Hv (WM) of the weld metal.

For example, first, the C content of the weld metal is estimated from a variety of conditions such as the chemical composition, sheet thickness, and welding conditions of a steel sheet to be butt-welded, and the chemical composition of a filler wire in a case in which the filler wire is used. Next, the hardness Hv (M) when the weld metal is martensite is calculated from the following formula (4) using the estimated C content. Next, the calculated hardness is subtracted by 100. Then, the lower limit of the hardness of the weld metal can be estimated.

[Expression 10]

$$Hv(M) = 884 \times C \times (1 - 0.3 \times C^2) + 294 \qquad \text{Formula (4)}$$

Here, 100 is a numeric value experimentally obtained. Aluminum is incorporated into the weld metal from the plated layer in the aluminum-plated steel sheet, and thus the $Ac_1$ point and the $Ac_3$ point of the weld metal increase. Therefore, depending on the heating conditions or the average Al concentration in the weld metal during the hot stamping process, the weld metal does not fully transform into austenite, and turns into a two-phase region in the hot stamping process, or does not austenite-transform at all, and is simply tempered. Here, the weld metal is softened the most in a case in which the weld metal does not austenite-transform, and is simply tempered, but it was experimentally confirmed that the hardness (degree of softening) is, at most, approximately Hv (M)–100. Therefore, the lower limit of the hardness of the weld metal can be obtained using Hv (M)–100.

In addition, regarding the hot-stamped steel sheet, a lower one of the value of Hv (M) calculated from the formula (2) and the value calculated from $\{1650 \times (C+f(B))+10 \times Si+80 \times (Mn+Cr+V+2 \times Mo+2 \times Nb+Cu/2+Ni/4)+Ni/4\}$ using the element contents (mass %) of the steel sheet is employed as the estimated value of Hv (BM).

Here, f(B) is a value determined by the B content, and, in the case of the B content≥0.0004 mass %, f(B)=0.03, and in the case of the B content<0.0004 mass %, f(B)=0.

It is possible to estimate the possibility of the assembly of a steel sheet configuring the tailored blank by determining whether or not the above-described conditions are satisfied based on the estimated value of the hardness obtained in the above-described manner, the sheet thickness of the steel sheet to be butt-welded, and the minimum thickness of the weld metal.

4. Method for Manufacturing a Hot-Stamped Member

A method for manufacturing a hot-stamped member according to the embodiment includes a hot stamping process (S3) for performing hot stamping on the above-described tailored blank according to the embodiment, and, after the hot stamping process, the product of the hardness of the weld metal and the thinnest portion of the weld metal is set to be greater than the product of the hardness and the sheet thickness of any one aluminum-plated steel sheet to be welded. The hot stamping conditions may follow an ordinary method. That is, in a case in which quenching is performed in the hot stamping process, it is normal to heat an aluminum-plated steel sheet, which is the subject, to a temperature of the $Ac_3$ point or higher (for example, approximately 900° C.), and then perform hot stamping. In a case in which the quenched structure is made into a complex structure, the heating temperature may be set in a range of the $Ac_1$ point to the $Ac_3$ point.

From the viewpoint of reliably performing the quenching of the tailored blank for hot stamping, it is preferable to use a direct water-cooling die in which the steel sheet is cooled by spraying cooling water from the die as a die for hot stamping.

Figure 3:
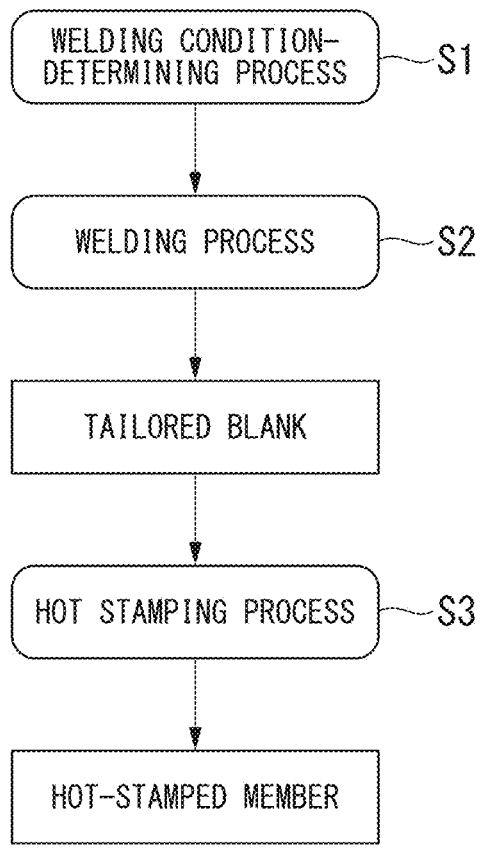
FIG. 3 is a flowchart showing an example of a method for manufacturing a hot-stamped member according to the embodiment.

FIG. 3 shows an example of the above-described method for manufacturing a hot-stamped member.

Example 1

To obtain a tailored blank having different strengths in some parts after hot stamping, a steel sheet 1 (Steel Type HS) having a tensile strength which reached 1470 MPa or mote after hot stamping and steel sheets 2 (Steel Types 270, 440, and 590) having tensile strengths before hot stamping of 270 MPa, 440 MPa, and 590 MPa were prepared. The sheet thicknesses of the steel sheets were set in a range of 1.0 mm to 1.8 mm.

To individually prepare the average aluminum concentrations in the weld metal, a steel sheet having an aluminum plate coated on only one surface in an amount of 20 gr/m$^2$, and steel sheets having aluminum plates coated on both surfaces in an amount of 20 gr/m$^2$ per surface, 40 gr/m$^2$ per surface, and 80 gr/m$^2$ per surface were produced for test purposes by coating aluminum plates to the outer surfaces of the steel sheets having no aluminum plate.

The steel sheets were brought face-to-face each other as shear-cut, and were welded using fiber laser. The light collection spot diameter of the laser was set to 0.6 mm. Shielding during the welding was performed using a shield nozzle (with an inner diameter of 6 mm) having the same axis as the laser beam with the standoff (the distance between the nozzle tip and the steel sheet surface) set to 10 mm under a condition of the Ar gas flow rate of 20 liters/min. The welding rate was maintained at 4 m/min, and the laser output was adjusted in a range of 2 kW to 4 kW in accordance with the sheet thickness.

The aluminum (Al) average concentration in the weld metal was analyzed and obtained using the weld metal sampled after an Al-concentrated layer on the surface was polished and removed after the laser welding. In addition, the cross-section observation of the welded portion and the measurement of the bead thickness were performed to check the qualities of the welded portion after the laser welding.

Subsequent to the laser welding, hot stamping was performed on the obtained tailored blank (blank material). The hot stamping was performed by heating the blank material to 900° C. through furnace heating, and inserting the blank material into a die, and a planar sheet was prepared.

To check the quenched state by the hot stamping, the hardness of the base metal portion after the hot stamping and the hardness of the weld bead portion were measured. In addition, the observation of the oxidization status of the weld bead surfaces during the hot stamping and a tensile test in which a load was applied orthogonally to the weld bead were performed as the performance evaluations of the hot-stamped members in which the strength was individually provided in some parts. The tensile test was performed in accordance with JIS 2241: 2011.

As a result of the tensile test, it was determined that a sufficient joint strength is obtained in a case in which the hot-stamped member was not fractured at the weld metal and but fractured at the base metal. However, in a case in which the hot-stamped member fractured at the base metal portion at a strength significantly lower than the original strength of the base metal, it was determined that a sufficient joint strength could not be obtained.

The used steel sheets and the results of a variety of measurements performed after the welding and the hot stamping are described in Tables 1 and 2.

The results of the tests performed on Nos. 1 to 15 could be evaluated as described below.

In a case in which a steel sheet for hot stamping including no plate and the steel sheet of Steel Type 270 including no plate were butt-welded, and then hot stamped, the average aluminum concentration in the weld metal was low, the aluminum layer on the weld bead surface was not observed, and thick oxide film was formed on the weld bead. The oxide film was partially peeled off when touched.

Therefore, it was not possible to obtain the adhesiveness of a coat even when coating was performed in the above-described state (No. 1). In addition, the same test was performed on the steel sheet having a plate coated only on one surface in an amount of 20 gr/m$^2$. As a result, as expected, the average aluminum concentration in the weld metal was low, the aluminum layer on the weld bead surface was not clear, and a thick oxide film was formed on the weld bead surface in the hot stamping process (No. 2).

Therefore, as a result of selecting a variety of plate coating weight or sheet thicknesses of the steel sheets, and performing tests in which the average aluminum concentrations in the weld metal are individually prepared, it was confirmed that, when the average aluminum concentration in the weld metal was 0.3 mass % or more, in the hot stamping process, it was possible to avoid the formation of a thick oxide film (Nos. 3 to 5, 9, 11, 12, and 14). In the above-described steel sheets, Al-concentrated layers were formed so as to cover the weld bead surfaces due to aluminum in the plates. It is considered that the Al-concentrated layers formed a dense oxide film on the weld bead surface during the hot stamping in synchronization with the selective oxidization of aluminum melted into the weld metal, and suppressed the formation of a thick oxide film.

On the other hand, when the average aluminum concentration in the weld metal became too high, the hardenability of the weld metal was lost, and the hot-stamped member fractured at the weld metal in the tensile test after the hot stamping (No. 7). When the plate coating weight became great, or the steel sheet thickness became thin, and thus the average Al concentration in the weld metal became high, at the heating temperature in the hot stamping process, the metallographic structure could not fully transform into austenite, and the weld metal was not sufficiently quenched. In addition, it could be confirmed that, when the $Ac_3$ point defined by the above-described formula (1) was higher than 1250° C., austenite was not generated during the cooling process after the laser welding, and the weld metal was not quenched. Therefore, the product of the hardness of the weld metal and the thickness of the thinnest portion in the weld metal became smaller than the product of the hardness of the low-strength-side base metal and the sheet thickness, the hot-stamped member fractured at the weld metal in the tensile test after the hot stamping (Nos. 6, 7, and 13).

In addition, when the thickness of the weld metal became too small compared with the sheet thickness of the base metal steel sheet, the strength of the welded joint portion was decreased, and the hot-stamped member fractured at the weld metal in the tensile test after the hot stamping (No. 13).

In addition, Nos. 9 and 10 are examples in which the thickness of the weld metal was adjusted by supplying a solid wire (YGW12) having a diameter of 0.9 mm during the welding to ensure the thickness of the weld metal. The feeding speeds were set to two types, that is, the same as the welding rate and double the welding rate. At the feeding speed that was the same as the welding rate, fracture occurred at the base metal, and a favorable joint could be obtained (No. 9); however, when the feeding speed was set to double the welding rate, the bead became high, the base metal in the vicinity of the weld bead was not quenched, fracture occurred at a low strength compared with the strength of the base metal (No. 10).

TABLE 1

| No. | Steel sheet 1 | | | Steel sheet 2 | | | Filler feeding speed ratio | Average Al concentration of weld metal (mass %) | $Ac_3$ of weld metal (° C.) | Oxidization of bead surface during hot stamping | Aluminum layer on bead surface |
|---|---|---|---|---|---|---|---|---|---|---|---|
| | Steel type | Sheet thickness (mm) | Plate thickness $(gr/m^2/gr/m^2)$ | Steel type | Sheet thickness (mm) | Plate thickness $(gr/m^2/gr/m^2)$ | | | | | |
| 1 | HS | 1.6 | 0/0 | 270 | 1.6 | 0/0 | — | 0.04 | 836 | Yes | No |
| 2 | | 1.6 | 20/0 | | 1.6 | 20/0 | — | 0.19 | 899 | Yes | Not clear |
| 3 | | 1.6 | 20/20 | | 1.6 | 20/20 | — | 0.35 | 963 | No | Yes |
| 4 | | 1.8 | 40/40 | | 1.8 | 40/40 | — | 0.60 | 1062 | No | Yes |
| 5 | | 1.0 | 40/40 | | 1.0 | 40/40 | — | 1.05 | 1243 | No | Yes |
| 6 | | 1.4 | 80/80 | | 1.4 | 80/80 | — | 1.49 | 1417 | No | Yes |
| 7 | | 1.2 | 80/80 | | 1.2 | 80/80 | — | 1.73 | 1514 | No | Yes |
| 9 | | 1.8 | 40/40 | | 1.8 | 40/40 | One | 0.44 | 995 | No | Yes |
| 10 | | 1.8 | 40/40 | | 1.8 | 40/40 | Two | 0.35 | 956 | No | Yes |
| 11 | HS | 1.8 | 40/40 | 440 | 1.8 | 40/40 | — | 0.59 | 1038 | No | Yes |
| 12 | | 1.0 | 40/40 | | 1.0 | 40/40 | — | 1.05 | 1218 | No | Yes |
| 13 | | 1.8 | 80/80 | | 1.8 | 80/80 | — | 1.16 | 1263 | No | Yes |
| 14 | HS | 1.8 | 40/40 | 590 | 1.8 | 40/40 | — | 0.60 | 1040 | No | Yes |

TABLE 2

| | After hot stamping (hot-stamped member) | | | | | | |
|---|---|---|---|---|---|---|---|
| No. | Hardness of low-strength-side parent material (Hv) | Sheet thickness × hardness of low-strength-side parent material | Hardness of weld bead (Hv) | Thickness of weld bead (mm) | Thickness proportion of weld bead (%) | Sheet thickness × hardness of weld bead | Tensile test |
| 1 | 195 | 312 | 324 | 1.5 | 94 | 486 | Fractured at parent material |
| 2 | 193 | 309 | 320 | 1.45 | 91 | 464 | Fractured at parent material |
| 3 | 196 | 314 | 310 | 1.55 | 97 | 481 | Fractured at parent material |
| 4 | 192 | 346 | 243 | 1.7 | 94 | 413 | Fractured at parent material |
| 5 | 199 | 199 | 240 | 0.9 | 90 | 216 | Fractured at parent material |
| 6 | 195 | 273 | 199 | 1.3 | 93 | 259 | Fractured at weld metal |
| 7 | 192 | 230 | 202 | 1.1 | 92 | 222 | Fractured at weld metal |
| 9 | 191 | 344 | 260 | 0.25/0.28* | 129 | 606 | Fractured at parent material |
| 10 | 160 | 288 | 201 | 0.45/0.65* | 161 | 468 | Fractured at low strength |
| 11 | 277 | 499 | 366 | 1.65 | 92 | 604 | Fractured at parent material |
| 12 | 280 | 280 | 339 | 0.95 | 95 | 322 | Fractured at parent material |
| 13 | 275 | 495 | 284 | 1.35 | 75 | 383 | Fractured at weld metal |
| 14 | 370 | 666 | 390 | 1.75 | 97 | 683 | Fractured at parent material |

*Front-side swell height/back-side swell height

Example 2

To obtain a tailored blank having different strengths in some parts after hot stamping, a steel sheet (Steel Type HS) having a tensile strength which reached 1470 MPa or more by hot stamping and a steel sheet (Steel Type 590) having a tensile strength before hot stamping of 590 MPa were joined through laser welding or plasma welding. The sheet thicknesses of the used steel sheets were set in a range of 1.0 mm to 1.8 mm.

At this time, to individually prepare the average aluminum concentrations in the weld metal, in addition to a steel sheet having no aluminum plate, steel sheets having aluminum plates coated on both surfaces in an amount of 40 $gr/m^2$ per surface and 80 $gr/m^2$ per surface were produced.

The steel sheets were brought face-to-face each other as shear-cut, the groove intervals between the steel sheets were adjusted, and then the steel sheets were welded using fiber laser while supplying a filler metal during the welding.

A laser beam having a focal distance of 300 mm and a light collection optical system having a light collection spot diameter of 0.6 mm were used, and the defocus distance was set to 18 mm. Shielding during the welding was performed using a shield nozzle (with an inner diameter of 6 mm) having the same axis as the laser beam with the standoff (the distance between the nozzle tip and the steel sheet surface) set to 10 mm under a condition of the Ar gas flow rate of 30 liters/min. The welding rate and the processing point output were maintained at 4 m/min and 4.5 kW, and the supply rate of the filler metal was adjusted in accordance with the sheet thickness and the intervals of the grooves so as to be approximately the same as the sheet thickness.

During butt welding, the groove intervals between the sheets were changed from 0.1 mm to 0.4 mm, a wire having a diameter of 1.2 mm was supplied as the filler metal, welding was performed, and the components of the weld metal were adjusted.

As the filler metal, four filler wires, that is, a metal core wire SX-1LD manufactured by Nippon Steel & Sumikin Welding Co., Ltd., a solid wire YGW12, a solid wire Filler-A (C: 0.45%, Si: 0.8%, Mn: 1.5%, P: 0.015%, and S: 0.011%) which was produced at that time for test purposes, and a metal cored wire Filler-B (C: 0.6%, Si: 0.8%, Mn: 6.0%, P: 0.01%, and S: 0.009%) produced for test purposes were used.

After laser welding, the Al-concentrated layer on the surface was ground and removed, and the average aluminum concentration in the weld metal was analyzed and obtained using the sampled weld metal. In addition, to check the qualities of the welded portion after the laser welding, the cross-section observation of the welded portion and the measurement of the bead thickness were performed.

After the welding, the obtained tailored blank (blank material) was hot-stamped. The hot stamping was performed by heating the blank material to 900° C. through furnace heating, and inserting the blank material into a die, and a planar sheet was prepared. After the hot stamping, to check the quenched state by the hot stamping, the hardness of the low-strength-side base metal portion after the hot stamping and the hardness of the weld bead portion were measured. In addition, a tensile test in which a load was applied orthogonally to the weld bead was performed as the performance evaluations of the hot-stamped members in which the strength was individually provided in some parts, and a Charpy impact test was performed to investigate the toughness of the welded portion. In the impact test, the notch location in a notch test specimen was set in the center of the weld metal. The tensile test was performed in accordance with JIS 2241: 2011, and the Charpy impact test was performed in accordance with JIS Z2242: 2005.

The used steel sheets and the results of a variety of measurements performed after the welding and the hot stamping are described in Tables 3 and 4.

The results of the tests performed on Nos. 101 to 121 could be evaluated as described below.

When the plate coating weight was great, or the sheet thickness of the steel sheet was thin, the average aluminum concentration in the weld metal became too high. In a case in which the average aluminum concentration in the weld metal reached 1.5 mass % or more, the hardenability of the weld metal was lost, and the hot-stamped member fractured at the weld metal in the tensile test (No. 101).

Even in a case in which the average aluminum concentration was suppressed at less than 1.5 mass %, when the intervals of the grooves were narrow, an increase in the C content in the weld metal by a flux cored wire was small, and there was a case in which the $Ac_3$ point became high. Therefore, at the heating temperature in the hot stamping process, the metallographic structure could not fully transform into austenite, and there was a case in which the weld metal was not sufficiently quenched. It became clear that, when the $Ac_3$ point became higher, the weld metal was not quenched in laser welding as well. According to tests, when the $Ac_3$ point defined by the above-described formula (1) was higher than 1250° C., the weld metal did not transform into austenite even during the cooling process after the laser welding, and the weld metal was not quenched. Therefore, it was confirmed that the hardness of the weld metal became low compared with the hardness of the base metal, and the hot-stamped member fractured at the weld metal in the tensile test after the hot stamping. In addition, it was also confirmed in the impact test that cracks propagated in the weld metal and the hot-stamped member fractured at the weld metal (Nos. 102, 112, 115, and 118).

Therefore, the groove intervals between the steel sheet were set to be great, and welding was performed by supplying a flux cored wire SX-1LD having a great C content and a great Mn content. As a result, it was possible to increase the C content in the weld metal and to decrease the average concentration of Al, and therefore the weld metal was quenched, the hardness of the weld metal became high compared with the hardness of the base metal, and it could be confirmed that the hot-stamped member fractured at the low-strength-side base metal in the tensile test after the hot stamping. In addition, since the toughness of the weld metal was also sufficient in the impact test, cracks propagated through the base metal, and the hot-stamped member fractured at the base metal (Nos. 103 to 106, 109, 113, 114, 116, 117, and 120).

However, when the thickness of the weld metal was too thin compared with the sheet thickness of the base metal steel sheet, the strength of the welded joint portion decreased, and the hot-stamped member fractured at the weld metal after hot stamping (No. 107). When the supply amount of SX-1LD was excessively increased to prevent the fracture at the weld metal, the thickness of the weld metal became too thick, the contact between the steel sheet and the die in the vicinity of the welded portion became poor during the hot stamping, the low-strength-side base metal was not quenched, and the joint fractured at a lower strength than the strength of the base metal (No. 108).

Next, the effects of the solid wire YGW12, the solid wire Filler-A produced for test purposes, in which the C content and the Mn content were increased and, the metal cored wire Filler-B produced for test purposes in which the C content and the Mn content were increased so as to be greater than those of SX-1LD, were investigated.

As a result of performing welding by supplying YGW 12, the $\Delta t_M$ value became shorter than 0.5 seconds, and the weld metal was not sufficiently quenched during the hot stamping. Therefore, the hardness of the weld metal became low compared with the hardness of the base metal, and the hot-stamped member fractured at the weld metal in the tensile test after the hot stamping (No. 110).

As a result of performing welding while supplying the solid wire Filler-A produced for test purposes, it was possible to increase the C content in the weld metal and decrease the average concentration of Al. Therefore, the weld metal was quenched, and the hardness of the weld metal became high compared with the hardness of the base metal. As a result, the hot-stamped member fractured at the low-strength-side base metal in the tensile test after the hot stamping. However, in the solid wire, the oxygen content in the weld metal is at approximately 40 ppm more than the average value of the base metal, and the toughness of the weld metal became low, and therefore, in the impact test, cracks propagated in the weld metal, and the hot-stamped member fractured at the weld metal (No. 111).

As a result of performing welding using the metal cored wire Filler-B produced for test purposes, in spite of the conditions under which a great content of Al was incorporated into the weld metal (the groove intervals of the steel sheet were small, the sheet thickness of the steel sheet was thin, and the plate thickness was also thick), the weld metal was quenched, and the hardness of the weld metal became high compared with the hardness of the base metal. As a result, it could be confirmed that the hot-stamped member fractured at the low-strength-side base metal in the tensile test after the hot stamping. In addition, since the metal cored wire was used as the filler metal, oxygen was incorporated in the weld metal, the toughness of the weld metal became sufficient, and cracks propagated through the base metal, and the hot-stamped member fractured at the base metal in the impact test (No. 119).

As a result of performing welding by supplying SX-1LD using plasma welding instead of laser welding as the welding method, the weld bead width became as wide as 2 mm or more, and therefore a great Al content was supplied from the steel sheet plated layer to the weld metal, and the estimated value of the $Ac_3$ point was above 1250° C. irrespective of the sufficient groove intervals. As a result, the metallographic structure did not transform into austenite during the cooling process after the laser welding, and the weld metal was not quenched. Therefore, the hardness of the weld metal became small compared with the hardness of the base metal, and it was confirmed that the hot-stamped member fractured at the weld metal in the tensile test after the hot stamping (No. 112). However, since the same plasma welding also decreased the average aluminum concentration of the weld metal, as a result of performing welding by setting the sheet thickness of the steel sheet to be as thick as 1.8 mm, setting the plate coating weight to 40 gr/m², and supplying SX-1LD, the estimated value of the $Ac_3$ point was below 1250° C., and the weld metal was quenched during the cooling process after the laser welding. In addition, since it was possible to set the thickness of the weld metal in the sheet thickness direction to be equal to or greater than the sheet thickness of the base metal using the wire, the value of "the sheet thickness×hardness of the weld metal" surely became equal to or greater than the value of "the sheet thickness×hardness of the base metal", and it was confirmed that the hot-stamped member fractured at the base metal after the hot stamping in the tensile test. Furthermore, it was confirmed that, since the metal cored wire was used, in the impact test as well, cracks propagated through the base metal, and the hot-stamped member fractured at the base metal (No. 121).

TABLE 3

| | | Steel sheet 1 | | | Steel sheet 2 | | | |
| --- | --- | --- | --- | --- | --- | --- | --- | --- |
| No. | Steel type | Sheet thickness (mm) | Plate thickness (gr/m²/gr/m²) | Steel type | Sheet thickness (mm) | Plate thickness (gr/m²/gr/m²) | Intervals | Welding method |
| 101 | HS | 1.0 | 80/80 | 590 | 1.0 | 80/80 | 0.1 | Laser |
| 102 | | 1.2 | 80/80 | | 1.2 | 80/80 | 0.1 | Laser |
| 103 | | 1.2 | 80/80 | | 1.2 | 80/80 | 0.4 | Laser |
| 104 | | 1.2 | 80/80 | | 1.2 | 80/80 | 0.3 | Laser |
| 105 | | 1.4 | 80/80 | | 1.4 | 80/80 | 0.4 | Laser |
| 106 | | 1.8 | 80/80 | | 1.8 | 80/80 | 0.4 | Laser |
| 107 | | 1.2 | 80/80 | | 1.2 | 80/80 | 0.3 | Laser |
| 108 | | 1.2 | 80/80 | | 1.2 | 80/80 | 0.4 | Laser |
| 109 | | 1.2 | 40/40 | | 1.2 | 40/40 | 0.4 | Laser |
| 110 | | 1.2 | 40/40 | | 1.2 | 40/40 | 0.2 | Laser |
| 111 | | 1.2 | 40/40 | | 1.2 | 40/40 | 0.4 | Laser |
| 112 | | 1.2 | 80/80 | | 1.2 | 80/80 | 0.4 | Plasma |
| 113 | | 1.0 | 80/80 | | 1.0 | 80/80 | 0.4 | Laser |
| 114 | | 1.8 | 80/80 | | 1.0 | 80/80 | 0.4 | Laser |
| 115 | | 1.8 | 80/80 | | 1.0 | 80/80 | 0.2 | Laser |
| 116 | | 1.6 | 40/40 | | 1.6 | 40/40 | 0.4 | Laser |
| 117 | | 1.4 | 40/40 | | 1.4 | 40/40 | 0.4 | Laser |
| 118 | | 1.0 | 80/80 | | 1.0 | 80/80 | 0.2 | Laser |
| 119 | | 1.0 | 80/80 | | 1.0 | 80/80 | 0.2 | Laser |
| 120 | | 1.0 | 40/40 | | 1.0 | 40/40 | 0.2 | Laser |
| 121 | | 1.8 | 40/40 | | 1.8 | 40/40 | 0.4 | Plasma |

| No. | Filler | Average Al concentration in weld metal (mass %) | $Ac_3$ of weld metal(° C.) | $\Delta t_M$ | Oxygen increase amount from parent material | $Ac_1$(° C.) |
| --- | --- | --- | --- | --- | --- | --- |
| 101 | SX-1LD | 1.51 | 1387 | 3.6 | 120 | 940 |
| 102 | SX-1LD | 1.20 | 1261 | 4.3 | 150 | 891 |
| 103 | SX-1LD | 0.84 | 1103 | 12.7 | 80 | 840 |
| 104 | SX-1LD | 0.97 | 1160 | 8.6 | 80 | 858 |
| 105 | SX-1LD | 0.78 | 1083 | 10.4 | 170 | 830 |
| 106 | SX-1LD | 0.60 | 1008 | 11.5 | 200 | 803 |
| 107 | SX-1LD | 0.97 | 1160 | 8.6 | 150 | 858 |
| 108 | SX-1LD | 0.84 | 1103 | 12.7 | 120 | 840 |
| 109 | SX-1LD | 0.43 | 937 | 14 | 150 | 780 |
| 110 | YGW12 | 0.57 | 1037 | 0.48 | 150 | 788 |
| 111 | Filler-A | 0.44 | 948 | 4.67 | 40 | 781 |
| 112 | SX-1LD | 1.20 | 1261 | 4.3 | 220 | 891 |
| 113 | SX-1LD | 0.92 | 1132 | 15.4 | 120 | 853 |
| 114 | SX-1LD | 0.89 | 1129 | 7.3 | 120 | 846 |
| 115 | SX-1LD | 1.18 | 1255 | 2.8 | 120 | 886 |
| 116 | SX-1LD | 0.34 | 905 | 11.5 | 150 | 768 |
| 117 | SX-1LD | 0.41 | 935 | 10.4 | 120 | 777 |
| 118 | SX-1LD | 1.23 | 1267 | 7.1 | 150 | 898 |
| 119 | Filler-B | 1.23 | 1204 | 235 | 100 | 847 |
| 120 | SX-1LD | 0.64 | 1031 | 7.1 | 100 | 807 |
| 121 | SX-1LD | 0.38 | 924 | 7.1 | 250 | 769 |

TABLE 4

| | | | | | | | | |
|---|---|---|---|---|---|---|---|---|
| | | | | After hot stamping (hot-stamped member) | | | | |
| No. | Hardness of low-strength-side parent material (Hv) | Sheet thickness × hardness of low-strength-side parent material | Hardness of weld bead (Hv) | Thickness of weld bead (mm) | Thickness proportion of weld bead (%) | Sheet thickness × hardness of weld bead | Tensile test | Charpy impact test |
| 101 | 383 | 383 | 329 | 1.1 | 110 | 362 | Fractured at weld metal | Propagated through weld metal |
| 102 | 384 | 461 | 339 | 1.3 | 111 | 451 | Fractured at weld metal | Propagated through weld metal |
| 103 | 380 | 456 | 395 | 1.3 | 108 | 514 | Fractured at parent material | Propagated through parent material |
| 104 | 382 | 458 | 385 | 1.4 | 117 | 539 | Fractured at parent material | Propagated through parent material |
| 105 | 377 | 528 | 381 | 1.5 | 107 | 572 | Fractured at parent material | Propagated through parent material |
| 106 | 380 | 684 | 385 | 2.0 | 111 | 770 | Fractured at parent material | Propagated through parent material |
| 107 | 382 | 458 | 372 | 0.9 | 78 | 346 | Fractured at weld metal | Propagated through weld metal |
| 108 | 160 | 192 | 390 | 1.9 | 158 | 741 | Fractured at low strength | Propagated through parent material |
| 109 | 378 | 454 | 395 | 1.4 | 117 | 553 | Fractured at parent material | Propagated through parent material |
| 110 | 381 | 457 | 241 | 1.3 | 129 | 313 | Fractured at weld metal | Propagated through weld metal |
| 111 | 380 | 456 | 403 | 1.4 | 129 | 564 | Fractured at parent material | Propagated through weld metal |
| 112 | 382 | 458 | 339 | 1.3 | 108 | 441 | Fractured at weld metal | Propagated through weld metal |
| 113 | 385 | 385 | 399 | 1.2 | 120 | 479 | Fractured at parent material | Propagated through parent material |
| 114 | 384 | 384 | 373 | 1.2 | 120 | 448 | Fractured at parent material | Propagated through parent material |
| 115 | 385 | 385 | 329 | 1.1 | 110 | 362 | Fractured at weld metal | Propagated through weld metal |
| 116 | 384 | 614 | 387 | 1.8 | 113 | 697 | Fractured at parent material | Propagated through parent material |
| 117 | 379 | 531 | 381 | 1.6 | 114 | 610 | Fractured at parent material | Propagated through parent material |
| 118 | 386 | 386 | 360 | 1.1 | 105 | 378 | Fractured at weld metal | Propagated through weld metal |
| 119 | 384 | 384 | 421 | 1.2 | 120 | 505 | Fractured at parent material | Propagated through parent material |
| 120 | 378 | 378 | 382 | 1.2 | 120 | 458 | Fractured at parent material | Propagated through parent material |
| 121 | 379 | 682 | 385 | 2.1 | 117 | 809 | Fractured at parent material | Propagated through parent material |

INDUSTRIAL APPLICABILITY

According to the present invention, it is possible to provide a tailored blank for hot stamping having a high joint strength after hot stamping even when an aluminum-plated steel sheet is butt-welded without removing a plated layer in a portion to be welded.

In addition, according to the present invention, it is possible to provide a hot-stamped member having a high joint strength after hot stamping even when a tailored blank for hot stamping obtained by performing butt welding on an aluminum-plated steel sheet without removing a plated layer in a portion to be welded is used. Furthermore, since the surfaces of the weld beads after welding are covered with aluminum, it is possible to solve the problem of the occurrence of the decarburization or oxidization of the weld metal during hot stamping or the problem of a member obtained by hot stamping having poor corrosion resistance after hot stamping.

The invention claimed is:

1. A hot-stamped member obtained by performing hot stamping on a tailored blank for hot stamping,
    wherein the tailored blank for hot stamping includes
        a welded portion comprising a weld metal formed by butt-welding a first aluminum-plated steel sheet and a second aluminum-plated steel sheet,
    wherein an average Al concentration of the weld metal of the hot-stamped member in the welded portion is 0.3 mass % to 1.5 mass %, in the following formula (1), an $Ac_3$ point of the weld metal defined in unit ° C. is 1250° C. or lower, and
    wherein an aluminum layer formed during the butt-welding is present on a surface of the welded portion of the hot-stamped member, $$Ac_3 = 910 - 230 \times C^{0.5} - 15.2 \times Ni + 44.7 \times Si + 104 \times V + 31.5 \times Mo + 13.1 \times W - 30 \times Mn - 11 \times Cr - 20 \times Cu + 700 \times P + 400 \times Al + 120 \times As + 400 \times Ti \quad \text{Formula (1)}$$

where, C, Ni, Si, V, Mo, W, Mn, Cr, Cu, P, Al, As, and Ti in Formula (1) represent amounts of individual elements in the weld metal of the hot-stamped member in mass %, and elements not contained are considered to have an amount of zero in computation, and wherein a product of a hardness of the weld metal of the hot-stamped member and a thickness of a thinnest portion of the weld metal of the hot-stamped member is greater than both a product of a hardness of the first aluminum-plated steel sheet of the hot-stamped member and a sheet thickness of the first aluminum-plated steel sheet of the hot-stamped member and a product of a hardness of the second aluminum-plated steel sheet of the hot-stamped member and a sheet thickness of the second aluminum-plated steel sheet of the hot-stamped member.

2. The hot-stamped member according to claim 1,
    wherein, furthermore, in the following formula (2), $\Delta t_M$ defined in unit of second is 0.5 seconds or longer, $$\Delta t_M = \exp\left\{10.6\left(C + \frac{Si + 5 \times Al}{24} + \frac{Mn}{6} + \frac{Cu}{15} + \frac{Ni}{12} + \frac{Mo}{6} + \frac{Cr \times (1 - 0.16 \times \sqrt{Cr})}{8} + \Delta H\right) - 4.8\right\} \quad \text{Formula (2)}$$

where, C, Si, Al, Mn, Cu, Ni, Mo, and Cr in Formula (2) represent amounts of individual elements in the weld metal in mass %, elements not contained are considered to have an amount of zero in computation, and ΔH represents a numeric value defined as described below in accordance with the amount of B in mass % and fN when the fN is set to (0.02−N)/0.02 using the amount of N in the weld metal in mass %, when B≤0.0001, ΔH=0,
when 0.0001<B≤0.0002, ΔH=0.03×fN,
when 0.0002<B≤0.0003, ΔH=0.06×fN, and
when 0.0003<B, ΔH=0.09×fN.

3. The hot-stamped member according to claim 1,
wherein an $Ac_1$ point of the weld metal defined in unit ° C. in the following formula (3) is 860° C. or lower, $$Ac_1 = \exp(6.5792 - 0.038058 \times C + 0.052317 \times Si + 0.011872 \times Ni - 0.045575 \times V + 0.18057 \times Al + 0.011442 \times W - 0.013403 \times Cu + 5.5207 \times B + 0.91209 \times S - 1.1002 \times P + 0.060014 \times Mn \times C - 0.096628 \times Cr \times C + 0.050625 \times Cr \times Si + 0.39802 \times Mo \times C - 0.34782 \times Mo \times Mn + 0.40986 \times Mo \times Si - 0.12959 \times Mo \times Cr - 0.048128 \times Ni \times C - 0.01090 \times Mn^2 - 0.03550 \times Si^2 + 0.010207 \times Cr^2 + 0.36074 \times Mo^2 - 0.0030705 \times Ni^2)$$  Formula (3)

where, C, Si, Ni, V, Al, W, Cu, B, S, P, Mn, Cr, and Mo in Formula (3) represent amounts, in mass %, of individual elements in the weld metal, and elements not contained are considered to have an amount of zero in computation.

4. The hot-stamped member according to claim 1,
wherein a thickness of a thinnest portion of the weld metal is represented by t in unit mm, a sheet thickness of the first aluminum-plated steel sheet is represented by t1 in unit mm, and a sheet thickness of the second aluminum-plated steel sheet is represented by t2 in unit mm,
when the t1 is equal to the t2, the t is 80% or more of the t1; and
when the t1 is different from the t2, the t is 80% or more of the smaller of the t1 and the t2.

5. The hot-stamped member according to claim 1,
wherein when the t1, which is a sheet thickness of the first aluminum-plated steel sheet is equal to t2, which is a sheet thickness of the second aluminum-plated steel sheet, a maximum height of the weld metal is 300 μm or shorter from an extended line of a surface of the first aluminum-plated steel sheet; and
when the t1 is different from the t2, a maximum height of the weld metal is 300 μm or shorter from an extended line of a surface of thicker of the first aluminum-plated steel sheet and the second aluminum-plated steel sheet.

6. The hot-stamped member according to claim 1,
wherein an oxygen content in the weld metal is 50 ppm or more higher than an average oxygen content in a first steel sheet that is a base material for coating of the first aluminum-plated steel sheet and a second steel sheet that is a base material for coating of the second aluminum-plated steel sheet.

\* \* \* \* \*